United States Patent
Betto et al.

(10) Patent No.: US 6,406,606 B1
(45) Date of Patent: Jun. 18, 2002

(54) ELECTROCOAGULATION PRINTING INK AND METHOD

(75) Inventors: Atsushi Betto; Tetsu Otsuji; Katsuhiko Sawamura; Hiroyuki Kawashima, all of Tokyo (JP)

(73) Assignee: Toyo Ink Mfg. Co., Ltd., Tokyo (JP)

( * ) Notice: Subject to any disclaimer, the term of this patent is extended or adjusted under 35 U.S.C. 154(b) by 0 days.

(21) Appl. No.: 09/531,157

(22) Filed: Mar. 17, 2000

(30) Foreign Application Priority Data

Mar. 18, 1999 (JP) ............................................ 11-074327
Mar. 30, 1999 (JP) ............................................ 11-089952
May 12, 1999 (JP) ............................................ 11-131598

(51) Int. Cl.$^7$ ................................................ B41M 5/20
(52) U.S. Cl. ........................ 205/52; 204/471; 204/483; 204/486; 106/31.28; 205/50
(58) Field of Search ................................ 204/471, 483, 204/486; 106/31, 28; 205/52, 50; 101/DIG. 29

(56) References Cited

U.S. PATENT DOCUMENTS

| | | | |
|---|---|---|---|
| 4,895,629 A | | 1/1990 | Castegnier et al. |
| 5,538,601 A | | 7/1996 | Castegnier |
| 5,693,206 A | | 12/1997 | Castegnier et al. |
| 5,750,593 A | * | 5/1998 | Castegnier et al. ......... 523/161 |
| 6,153,074 A | * | 11/2000 | Hiraki et al. ............... 204/471 |

FOREIGN PATENT DOCUMENTS

| | | |
|---|---|---|
| EP | 0 899 093 | 3/1999 |
| EP | 0 909 799 | 4/1999 |
| JP | 04328175 A | * 11/1992 |
| WO | WO 96/18507 | 6/1996 |

OTHER PUBLICATIONS

JPO English Abstract for JP–04328175–A, Nov. 17, 1992.*

* cited by examiner

*Primary Examiner*—Bruce F. Bell
*Assistant Examiner*—Wesley A. Nicolas
(74) *Attorney, Agent, or Firm*—Oblon, Spivak, McClelland, Maier & Neustadt, P.C.

(57) ABSTRACT

An electrocoagulation printing ink contains electrolytically coagulable polymer, soluble electrolyte, coloring agent, and liquid medium, where electrocoagulability is obtained by an electric circuit comprised of capacitor and resistor under constant voltage with the time constant of 0.02 seconds and the electrocoagulability obtained with the time constant of 0.09 seconds have a ratio from 1:1.5 to 1:3.0, hence improving the gradation reproducibility. Further, bisphenol sulfonic acid polymer can be used as a dispersant, and/or, a pigment in which the particle size of the pigment at 50% of the volume accumulation is 0.3 to 2 $\mu$m when dispersed in the ink and a ratio of particles with a particle size equal to or less than 0.2 $\mu$m is equal to or less than 25% by weight in the particle size distribution of the pigment, thereby producing a print free of undesirable background in its non-image region and high of quality.

14 Claims, 1 Drawing Sheet

FIGURE
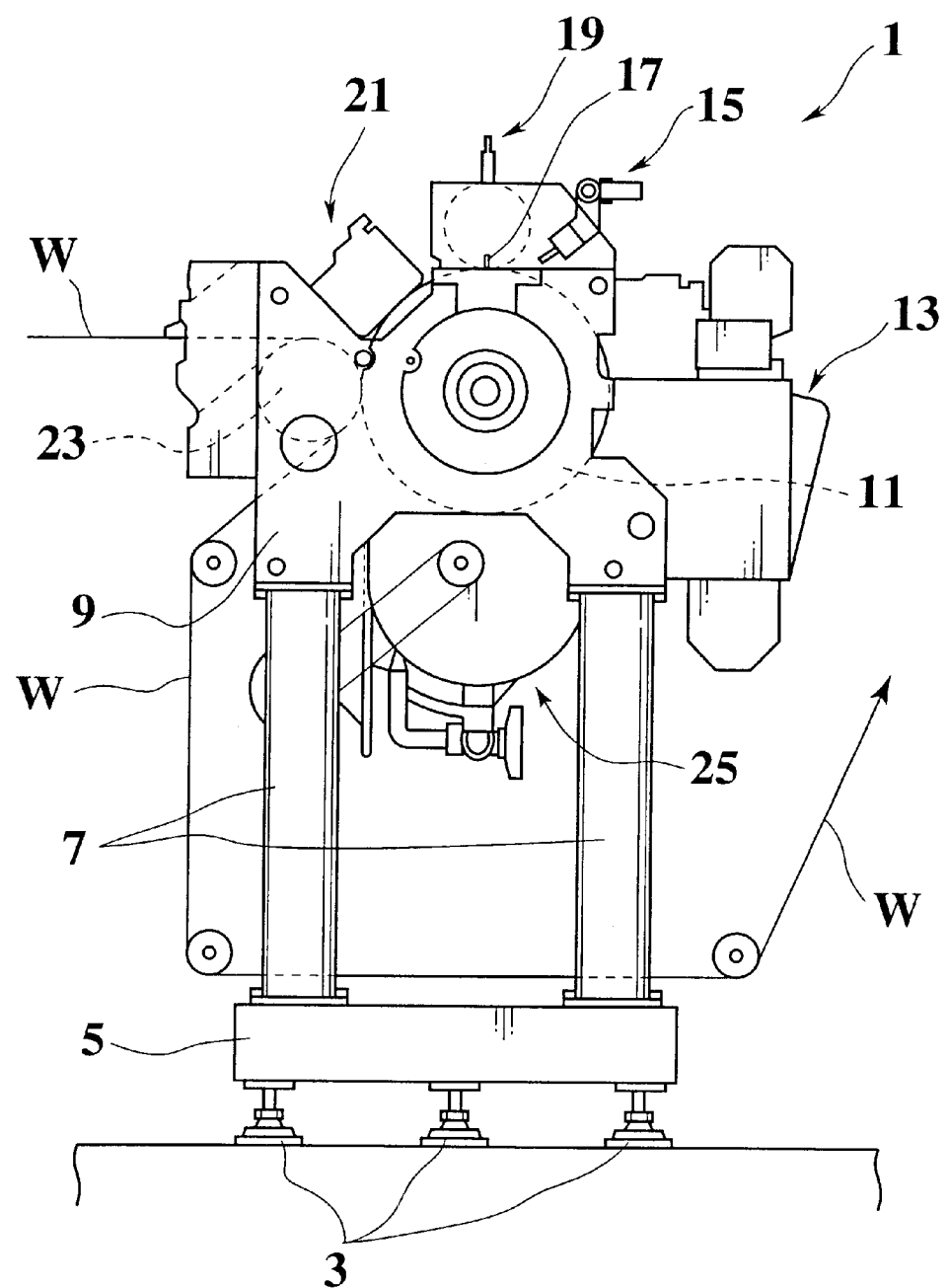

ELECTROCOAGULATION PRINTING INK AND METHOD

BACKGROUND OF THE INVENTION

1. Technical Field

The present invention relates to an improvement in the field of the electrocoagulation printing. More particularly, the invention relates to an electrocoagulation printing ink capable of enhancing a gradation reproducibility and preventing an undesirable background in a non-image region of the print, and a printed matter as well as an electrocoagulation printing method using the ink.

2. Background Art

The electrocoagulation printing is a printing method for carrying out a digital image printing to directly produce a print from a computer without using any printing plates. Some of the printing methods and apparatuses are disclosed in U.S. Pat. Nos. 4,895,629, 5,538,601, and 5,693,206.

In this printing method, after the surface of a positive electrode is cleaned and coated with a coating agent containing an oily substance, a plurality of dots of coagulated ink representing a desired image are produced on the surface of the positive electrode by electrocoagulation of the electrocoagulation printing ink which contains an electrolytically coagulable polymer. After removing any remaining non-coagulated ink from the surface of the positive electrode, the dots of coagulated ink are transferred to a substrate to be printed so as to imprint the substrate with the image.

The expression "electrocoagulation of the ink" in the electrocoagulation printing as used herein refers to a process which involves an electrical energizing between the positive and negative electrodes to cause a breakdown of passive oxide film on the surface of the positive electrode, thereby to elute multivalent metal ions from the surface of the positive electrode, and allowing the multivalent metal ions to react with the electrolytically coagulable polymer contained in the electrocoagulation printing ink so as to coagulate the ink. This forms dots of coagulated ink on the surface of the positive electrode. More particularly, the multivalent metal ions released from the positive electrode upon an electrical energizing form ion bonds and/or coordinate bonds with polymer molecules so as to crosslink the polymer molecules one another, so that a coagulum (dots) which is hardly soluble in water is formed.

It is requested for a print produced by the electrocoagulation printing as well as common offset or gravure printing to have a suitable degree of the gradation reproducibility (the expression of a gradation) showing smoothness from brightness to darkness and a practically acceptable level of the image density.

SUMMARY OF THE INVENTION

The gradation reproducibility is determined how many amount of the ink is electrolytically coagulated corresponding to a length of the electrical energizing time. The coagulability of the electrocoagulation printing ink corresponding to a positive electrode energizing rate (an amount of electric currents conducted to the positive electrode) is closely related with the degree of the gradation reproducibility. It is therefore focused on the linear response of electrocoagulability to the amount of the multivalent metal ions released from the positive electrode corresponding to the positive electrode energizing rate.

However, it is true that the amount of the multivalent metal ions is too small to be actually measured and therefore the relationship between the electrocoagulability of the electrocoagulation printing ink and the gradation reproducibility on the print remains unclear. Accordingly, it is difficult to propose any electrocoagulation printing ink improved in the gradation reproducibility.

On the other hand, the printing image density on a print which is in general affected by the concentration of a pigment contained in the ink is largely dependent on the size of dots produced by the electrocoagulation. The size of the dots is also dependent on the magnitude of the electrocoagulability corresponding to the amount of the multivalent metal ions released from the positive electrode. Increasing the image density by enlarging the size of the dots hardly improve the expression between brightness and darkness or the gradation reproducibility. It is therefore a significant issue to provide an improved ink balanced well between both the characteristics.

In addition, there is another requirement for improving the removal of non-coagulated ink. More specifically, after the electrocoagulation of a printing ink, a step of removing non-coagulated ink is conducted where the non-coagulated ink is removed from the surface of the positive electrode by a known manner, for example, scraping the surface with a soft rubber squeegee and then, the coagulated ink is transferred as a desired image onto a substrate to be printed. If the rigidity of the squeegee or its pressure against the surface of the positive electrode is increased in order to completely remove (or scrape off) the non-coagulated ink from the surface of the positive electrode, the dots of coagulated ink may partially be dropped out or injured. This may cause the declination of the image density or the generation of white streaks, and thereby decreasing the printing image sharpness, so that the quality of a print may be impaired. When the removal of the non-coagulated ink with the squeegee is failed, bits of the non-coagulated ink remain in the non-image region and may cause the undesirable background. It is a troublesome task to remove the non-coagulated ink to such an extent that an undesirable background on the print is not formed, by controlling the squeegee such that the dots of coagulated ink are not injured. Accordingly, there has been desired to develop an improved electrocoagulation printing ink of which non-coagulated portions of the ink can easily be removed from the surface of the positive electrode.

An another issue is that since the density of an image is controlled largely by an amount of currents supplied between the positive and negative electrodes, there are cases in which the maximum image density obtained using the conventional electrocoagulation printing ink is insufficient depending on normally used amount of the currents. It may be possible to obtain the image with a high density by increasing the electric conductivity of the electrocoagulation printing ink or the voltage applied between the positive and negative electrodes. However, heating the electrodes or excessively increasing the voltage may generate overloads to the relevant electric circuits. Accordingly, as the amount of the currents to be used has to be substantially limited, there are cases in which a deficiency in the image density obtained in practice may hardly be prevented.

It is therefore an object of the present invention to provide an electrocoagulation printing ink in which a level of the electrocoagulability can be changed according to the energizing rate, so that both the gradation reproducibility and the printing image density on a print can be improved, a printed matter printed with the ink and high of quality, and an electrocoagulation printing method employing the ink.

It is another object of the present invention to provide an electrocoagulation printing ink where non-coagulated ink can easily be removed from the surface of a positive electrode during the printing operation, thereby preventing the generation of undesirable background in a non-image region of the print and improving the image density; a printed matter printed with the ink and free of the declination of the image quality resulted from the undesirable background, with a high level of image density; and an electrocoagulation printing method employing the ink.

We, the inventors of the present invention, have found that both the gradation reproducibility and the image density on a print are largely dependent on the electrocoagulability and the time constant in an electric circuit comprising capacitor (C) and resistor (R) under constant voltage condition, and that an electrocoagulation printing ink has a suitable level of the electrocoagulability corresponding to the energizing rate and is able to produce a desired degree of the gradation reproducibility when a particular relationship between the electrocoagulability and the time constant is satisfied in the electrocoagulation printing ink, so that the electrocoagulation printing ink having both the better gradation reproducibility and the sufficient image density can be realized.

According to one aspect of the present invention there is provided an electrocoagulation printing ink contains an electrolytically coagulable polymer, a soluble electrolyte, a coloring agent, and a liquid medium, in which the electrocoagulability obtained by an electric circuit comprised of capacitor and resistor under constant voltage condition with the time constant of 0.02 seconds and the electrocoagulability obtained with the time constant of 0.09 seconds have a ratio from 1:1.5 to 1:3.0.

It is defined in the above ink that the time constant (T) is a product RC of the capacitance C and the resistance R. The resistance R actually measured in the electrocoagulation printing is formed by filling the electrocoagulation printing ink between the positive and the negative electrodes. When charged from the capacitor, the electrocoagulation printing ink between the positive and negative electrodes is crosslinked to form a coagulum which is hardly soluble in water. It is noted that the electrocoagulability (%) is expressed by [(dry weight of the coagulated ink)/(dry weight of the ink filled between the electrodes)×100].

The time constant of 0.02 seconds stands for an intermediate grade region of the print and the time constant 0.09 seconds stands for a dark or shadow region near the full black. When the relationship between the electrocoagulability and the time constant mentioned above is satisfied in the electrocoagulation printing ink, the graphic representation of its electrocoagulability versus energizing rate shows a suitable "slope" from the shadow region to the intermediate region. Accordingly, the "slope" from the highlight to the intermediate also becomes suitable, so that a printed matter with an excellent gradation reproducibility over the image can be provided.

According to another aspect of the present invention there is provided an electrocoagulation printing ink containing at least a bisphenol sulfonic acid polymer as a dispersant, an electrolytically coagulable polymer, a soluble electrolyte, a pigment, and a liquid medium. The bisphenol sulfonic acid polymer can effectively improve the surface property or the dispersibility of the pigment particles contained in the electrocoagulation printing ink, consequently improving both the releasability from the surface of the positive electrode and the image density. That is, the bisphenol sulfonic acid polymer can adhere to the hydrophobic surface of the pigment particles and give a hydrophilic property to the surface of the pigment particles. This allows non-coagulate ink to be released easily from the lipophilic surface of the positive electrode coated with a coating agent containing an oily substance, so that the formation of undesirable background over the print can be prevented. Further, the bisphenol sulfonic acid polymer has a higher stability when adhering to the surface of the pigment particles than any conventional dispersant such as naphthalene sulfonic acid-formaldehyde condensation. This absorption increases electrostatic repulsion between the particles of the pigment by applying negative charges to their surface. Accordingly, the higher dispersing effect can be achieved, thereby encouraging the development of colors and increasing the image density on the print.

According to another aspect of the present invention there is provided an electrocoagulation printing ink containing at least an electrolytically coagulable polymer, a soluble electrolyte, a pigment, and a liquid medium, in which the particle size of the pigment at 50% of the volume accumulation is 0.3 to 2 $\mu$m when dispersed in the ink, and a ratio of particles with a particle size equal to or less than 0.2 $\mu$m is equal to or less than 25% by weight in the particle size distribution of the pigment. In the electrocoagulation printing ink of the present invention, the particle size of the pigment is controlled in such a given range as explained above, so that the removal or scrape of the non-coagulated ink from the surface of the positive electrode can be facilitated and the formation of undesirable background over the non-image region of the print can be prevented.

A printed matter according to the present invention is printed with the electrocoagulation printing ink of the present invention. By using the electrocoagulation printing ink of the present invention, a printed matter which has an improved gradation reproducibility and a high level of the image quality can be produced. Also, by using the electrocoagulation printing ink of the present invention, it is possible to produce a printed matter with an improved image density and high of quality, without an undesirable background in its non-image region.

An electrocoagulation printing method according to the present invention is implemented using the electrocoagulation printing ink of the present invention, thereby producing a printed matters with high quality.

BRIEF DESCRIPTION OF THE DRAWING

FIG. 1 is a schematic view showing an example of an electrocoagulation printing apparatus which can be employed for embodying the present invention.

DESCRIPTION OF THE PREFERRED EMBODIMENTS

In the following description of the embodiments of the present invention, "electrocoagulation printing ink" is referred to as "ink".

The ink according to a first embodiment of the present invention comprises at least an electrolytically coagulable polymer, a soluble electrolyte, a coloring agent, (a dye and/or a pigment), and a liquid medium.

The polymer used in the ink is capable of making chemical bonding with multivalent metal Ions and preferably contains acid groups such as carboxyl groups, sulfone groups, phosphoric acid groups, or nitric acid groups, and more preferably carboxyl groups or sulfone groups.

Examples of the electrolytically coagulable polymer include natural polymers such as albumin, gelatin, casein and agar, and synthetic polymers such as polyacrylic acid, modified polyacrylic acid, modified polyacrylamide, polyacrylic acid hydrazide, and copolymer consisting of acrylic acid and acrylamide. They can be used individually or in combination. The modified polymer means a polymer of which physical or chemical characteristics are modified. It includes polymers modified by, for example, esterification, amidation, hydrolysis, or copolymerization with another monomer to be linked partially.

The acid value of the electrolytically coagulable polymer is preferably 30 to 200 mgKOH/g and more preferably 50 to 130 mgKOH/g. When the acid value is within such a preferable range, speed of the electrocoagulation can reach a suitable rate and the electrocoagulability can easily be controlled in a desired ratio (electrocoagulability with the time constant of 0.02 seconds to electrocoagulability with the time constant 0.09 seconds is from 1:1.5 to 1:3.0), so that a sufficient shading with the ink can be obtained. Also, when the acid value of the polymer is equal to or more than 30 mgKOH/g, the electrocoagulability is equal to or more than 2% by weight at 0.02 seconds of the time constant and equal to or more than 5% by weight at 0.09 seconds, so that a suitable degree of the image density can be achieved. If the acid value is too high, the electrocoagulability may drop down to below 5% by weight at 0.09 seconds of the time constant although it remains equal to or more than 2% by weight at 0.02 seconds of the time constant. As a result, the density over the print may be declined and cause a flatness of the gradation reproducibility. It is comprehensive from the following description. When the acid value is too high, the polymer applied in the vicinity of the positive electrode would react with a large quantity of the multivalent metal ions to thereby form a dense polymer coagulum about the positive electrode and hinder the diffusion of the multivalent metal ions, so that the volume of an obtained coagulated ink might be reduced.

The weight average molecular weight of the polymer ranges preferably from 100,000 to 800,000 for such a suitable ratio of the electrocoagulability as described above and an appropriate viscosity of the ink, so as to produce a desired degree of gradation reproducibility and image density. If the weight average molecular weight of the polymer is not to be excessive, the ink is kept from having excessive increase in viscosity and declination of its operation efficiency. When the use is made of the ink with an excessively high viscosity, the ink viscosity may need to be moderated by adding an increased quantity of water, accordingly there are cases in which a transfer of the ink to a substrate tends to decrease. The weight average molecular weight can be calculated, for example, using a gel filtration chromatography (a sensor ; a differential refractometer) and a relationship between limiting viscosity and weight average molecular weight of the polymer.

The amount of the polymer in the ink is preferably about 1 to about 13% by weight, and more preferably about 3 to about 11% by weight, based on the total weight of the ink. When the polymer is within such a preferable range, the strength for bonding pigments together in the coagulum becomes a suitable level in order to prevent a part of the coagulated ink from being scraped off by a squeegee which is used for removing the non-coagulated ink. Accordingly, a high quality of the printed image as well as an appropriate viscosity of the ink for a suitable operation efficiency can be achieved.

The soluble electrolyte contained in the ink is added in order to increase an electric conductivity of the ink and simultaneously cause a desired breakdown of passive oxide film on the surface of the positive electrode. Preferred electrolytes include halide, and more preferably chloride. Examples of alkali metal halides and alkaline earth metal halides include lithium chloride, sodium chloride, potassium chloride, and calcium chloride. Use can also be made of ammonium chloride, nickel chloride, copper chloride, and manganese chloride. They can be used individually or in combination.

For a desired electric conductivity (explained later), the amount of the soluble electrolyte in the ink is preferably about 3 to about 18% by weight, and more preferably about 6 to about 15% by weight, based on the total weight of the ink.

The coloring agent in the ink can be selected from organic and inorganic pigments and dyes generally used in common printing inks, paints, and recording agents. The coloring agents can be used individually. Or, they can be used in combination in order to prepare a desired combination of the hue and the density.

Examples of the organic pigments include azo, phthalocyanine, anthraguinone, perylene, perynon, quinacridone, thioindigo, dioxazine, isoindolinone, quinophthalone, azomethine, diketopyrrolopyrrole, and isoindoline pigments. Azo pigments, for example, Permanent Yellow DGR or DHG and Permanent Rubin F6B or L6B commercially available from Clariant, can preferably be used for a yellow ink and a red ink. Copperphthalocyanine pigment, for example, Heliogen Blue D7072DD commercially available from BASF or Hostaperm Blue B2G or B3G commercially available from Hoechst, can preferably be used for a cyan ink.

The inorganic pigments can be selected from carbon black, titaniumoxide, zinc oxide, zinc sulfide, barium sulfate, calcium carbonate, and chrome oxide. Carbon black is preferably used for a black ink. In particular, the use of carbon black which has an oil absorption of 65 to 120 ml/100 g and an average particle diameter of 35 to 100 nm can provide a printed matter with a quality improved in both the bluish tint and the density of deep black color. Examples of the carbon black include Carbon Black Monarch (a registered trademark) 120 which has an oil absorption of 72 ml/100 g and an average particle diameter of 75 nm, commercially available from Cabot Corp.

Each of those pigments is used in such an amount that the sufficient density of the dots formed by the electrocoagulation of the ink can be obtained. Its preferable amount in the ink is about 6.5 to about 15% by weight based on the total weight of the ink.

The dye can be selected arbitrary from acid dyes, basic dyes, direct dyes, reactive dyes, disperse dyes, and metal-containing dyes. The amount of the dye in the ink is preferably about 1 to about 7% by weight, and more preferably about 2 to about 5% by weight, based on the total weight of the ink.

For obtaining a desired tint or density of the ink, a pigment and a dye can be used in any combination. Because the use of a particular dye sometimes leads to decline the dispersion stability of the pigment or the resistance of a printed image against water and light, the amount of the dye may preferably be equal to or less than about 40% by weight and more preferably equal to or less than about 25% by weight on a pigment basis.

When the coloring agent in the ink of the present invention is a pigment, a dispersant can be used for stably and uniformly dispersing the pigment into a liquid medium. It is also possible to disperse the pigment into the electrolytically coagulable polymer with or without the use of a dispersant, and then disperse the polymer containing dispersed pigment into a liquid medium. More particularly, when the pigment employed is a self-dispersing type or the one dispersed with the electrolytically coagulable polymer, it is possible to achieve a desired state of the dispersion without using any dispersant, however the use of a dispersant can further facilitate the dispersion preferable for the present invention and the undesirable background can further be prevented.

Examples of the dispersant include anionic, cationic, nonionic, and amphoteric surfactants. They can be used individually or in combination. The preferable surfactants are, but not limited to, an alkali metal salt of naphthalene-sulfonic acid-formaldehyde polycondensate and more preferably a compound of the following chemical formula (1):

Chemical Formula (1)

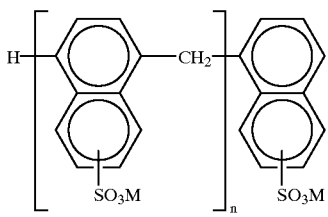

(in which M is an alkali metal and n is an integer ranging from 2 to 15). Preferably, M is sodium and n is 5 to 12. The alkali metal salt of naphthalenesulfonic acid-formaldehyde polycondensate can be available commercially from Kao Corporation, Sanyo Chemical Industries, Ltd., Sunnopco Limited, Dai-ichi Kogyo Seiyaku Co., Ltd., Kyoeisha Chemical Company, Ltd., Toho Chemical Industry Co., Ltd., and Boehme Filatex Canada Inc. For example, the compound specified by the above formula (1) in which M is sodium and n is 7 is sold in the form of aqueous solution which has about 42% of the effective component, under the trademark Closperse 2500 from Boehme Filatex Canada Inc.

For a storage stability of the ink and a sufficient density of coagulated dots transferred onto a substrate, the amount of the dispersant is preferably about 0.05 to about 5% by weight, and more preferably about 0.1 to about 2% by weight, based on the total weight of the ink.

The liquid medium in which the components aforementioned are dissolved or dispersed is preferably water.

The ink of the first embodiment composed as described above is arranged in which the electrocoagulability ratio A:B (a ratio of electrocoagulability with the time constant of 0.02 seconds to that with the time constant of 0.09 seconds) is from 1:1.5 to 1:3.0 under a condition of uniform voltage in an electric circuit including capacitor and resistor, hence having a suitable characteristic of the electrocoagulation corresponding to the energizing rate and implementing the production of high quality prints which are improved in the gradation reproducibility. If B in the electrocoagulability ratio A:B is less than 1.5, the gradation may become insufficient between intermediate region and shadow region and thereby fail to express an explicit difference between brightness and darkness. On the other hand, if B in the electrocoagulability ratio A:B exceeds 3.0, the gradation from highlight to intermediate may become insufficient thus producing hardly a smoothness of tones between the highlight and the shadow and thereby exhibiting no desired shading.

The electrocoagulability of the ink of this embodiment is preferably equal to or more than 2% by weight at 0.02 seconds of the time constant and equal to or more than 5% by weight at 0.09 seconds of the time constant, when the ink is filled between the positive electrode made of stainless steel and negative electrodes and a voltage of 50 V is applied between the both electrodes for the electrocoagulation. The electrocoagulation printing ink which satisfies the above mentioned specific electrocoagulability depending on the amount of trivalent iron ions released from the stainless steel under the above voltage condition can provide an improved electrocoagulability with a suitable "rise up" as well as a suitable "slope" shown in its graphic representation of the electrocoagulability versus energizing rate, thereby producing a printed matter improved in both the gradation reproducibility and the image density (i.e. the amount of coagulum). Moreover, the electrocoagulation printing ink with the foregoing electrocoagulation characteristics has a higher speed of the electrocoagulation, thereby contributing to the actual speedup of the printing operation.

That is, with the electrocoagulability of equal to or more than 5% by weight at 0.09 seconds of the time constant, the density of the print can be increased sufficiently, particularly in darker regions of the gradation. Further, with the electrocoagulability of equal to or more than 2% by weight at 0.02 seconds of the time constant, the density of the print can be increased sufficiently particularly between higher and intermediate regions of the gradation. As a result, the gradation reproducibility in an entirety of the print as well as the image density of the print is improved.

The electric conductivity of the ink is preferably 80 to 180 mS/cm and more preferably 100 to 160 mS/cm. When the electric conductivity is within such a range, the electrocoagulation rate, the gradation reproducibility, and the image density all are obtained suitably. An excessively high electric conductivity sometimes tents to cause lowering of the resistance of a print against water as the concentration of salt in the ink becomes high.

The pH of the ink is preferably in a range from 3 to 8 when measured at 25° C. and more preferably in a range from 3 to 6. If the pH is too low, the solubility of the components of the ink, such as electrolytically coagulable polymer, may decrease, so that the viscosity stability of the ink may be impaired. If the pH is too high, hydrates of the multivalent metal ions may be developed, so that there are cases in which the electrocoagulability may decrease, thereby the gradation reproducibility as well as the printing density tends to decline. The pH of the ink can be adjusted using conventionally known acids such as hydrochloric acid, sulfuric acid and acetic acid, and alkalis such as sodium hydroxide, potassium hydroxide and ammonium hydroxide.

An ink according to a second embodiment of the present invention will now be described in more detail.

The ink of the second embodiment comprises at least a bisphenol sulfonic acid polymer, an electrolytically coagulable polymer, a soluble electrolyte, a pigment, and a liquid medium, so that the development of undesirable background on non-image areas of a substrate can be prevented and a high level of the image density can be obtained.

The bisphenol sulfonic acid polymer as a dispersant is, but not limited to, a polymer of a compound which has a bisphenol molecular structure including sulfonic acid group ($-SO_3H$) and preferably a polymer of the following chemical formula (2):

Chemical Formula (2)

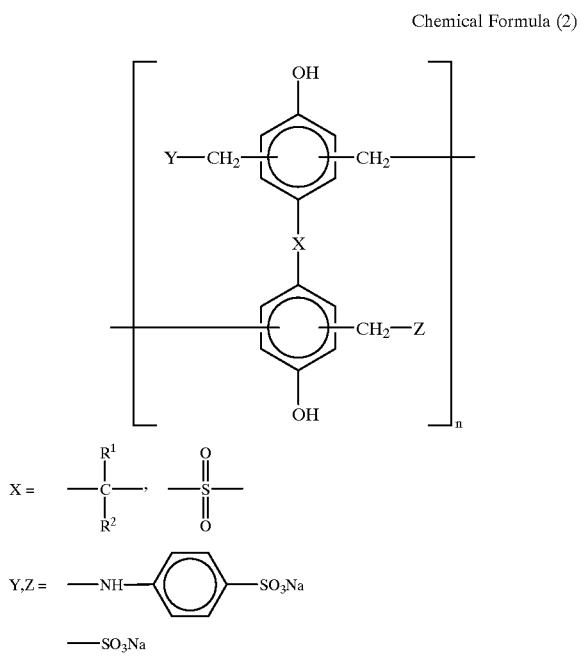

(in which n is an integer ranging from 7 to 40, and $R^1$ and $R^2$ are hydrogen atom or lower alkyl groups and may be the same or different). In the Formula (2), $R^1$ and $R^2$ are preferably hydrogen atom or methyl or ethyl groups and may be the same or different. More preferably, n is an integer ranging from 15 to 25. They can be used individually or in combination.

The weight average molecular weight of the bisphenol sulfonic acid polymer is preferably 5,000 to 30,000 and more preferably 10,000 to 30,000. The use of such polymer compounds thickens an absorption layer on the surface of a pigment particle, thereby giving repulsing forces like a steric hindrance between the pigment particles. As a result, it is considered that the dispersion stability can be maintained at a high level so as to enhance the image density and prevent the undesirable background. More particularly, when the weight average molecular weight is equal to or more than 5,000, i.e. n is 7 or more in the formula (2), the absorption on the pigment is enhanced to have a suitable level of the dispersion stability, so that desirable characteristics of the compound, i.e. preventing the undesirable background on non-image areas and improving the image density, can be obtained. Also, when the weight average molecular weight is equal to or below 30,000, i.e. n is 40 or less in the formula (2), the bisphenol sulfonic acid polymer is free of aggregation and maintain the suitable level of its absorption on the pigment surface.

The amount of the bisphenol sulfonic acid polymer in the ink is preferably 0.05 to 5% by weight, and more preferably in a range from about 0.1 to about 3% by weight, based on the total weight of the ink. When the amount is within such a preferable range, the ink has a sufficient dispersibility and storage stability, and free of secondary aggregation of the pigment particles. If the secondary aggregation of the pigment particles occurs, the coagulated ink dots transferred onto a substrate may be declined in the density unfavorably.

The electrolytically coagulable polymer of the second embodiment is identical to that of the first embodiment exemplified above. The electrolytically coagulable polymer is preferably a modified polyacrylamide such as nonionic, anionic, or cationic acrylamide polymer. The modified polyacrylamide is commercially available from various manufacturers including Arakawa Chemical Industries Inc., Mitsubishi Chemical Corporation, Harima Chemical Inc., Mitsui Chemicals Ltd., Mitsui Cytec Ltd., and Sanyo Chemical Industries Ltd. Preferably, use can be made of anionic acrylamide polymer commercially available from Mitsui Cytech Ltd. under the trademark Accostrength 86 or Accostrength 85.

The weight average molecular weight of the polymer is preferably about 10,000 to about 1,000,000 and more preferably about 100,000 to about 600,000. When the weight average molecular weight of the polymer is within such a preferable range, the coagulation of the ink readily occurs to produce a desired size of the coagulated ink dots, limiting the ink viscosity to an appropriate range, thereby maintaining a suitable level of the operation efficiency during the production of the ink and the printing operation using the ink.

The amount of the electrolytically coagulable polymer is preferably about 4 to about 15% by weight, and more preferably about 6 to about 12% by weight, based on the total weight of the ink. When the amount is within such a preferable range, the size of the coagulated dots is obtained sufficiently to produce a desired density of the coagulated ink transferred onto a substrate, and the ink viscosity is maintained within an appropriate range, thereby maintaining a suitable level of the operation efficiency during the production of the ink and the printing operation using the ink.

The soluble electrolyte used preferably in this embodiment is identical to that of the first embodiment exemplified above. The electric conductivity of the ink of this embodiment is preferably equal to or more than 1 mS/cm and equal to or less than about 200 mS/cm, when measured at 25° C. When the electric conductivity is equal to or more than 1 mS/cm, the ink is electrolytically coagulated enough to produce a desired level of the reflective density (optical density) of the coagulated ink on a substrate. Accordingly, the soluble electrolyte is added in such an amount that the electric conductivity of the ink falls within the above range. In general, the electrolyte is preferably used in an amount of about 5 to about 10% by weight, and more preferably in an amount of about 6 to about 9% by weight, based on the total weight of the ink.

The pigment used preferably in this embodiment is identical to that of the first embodiment exemplified above. The amount of the pigment is about 4 to about 20% by weight based on the total weight of the ink. The pigment may be applied in the form of either aqueous slurry or dried powder produced by drying the slurry, for example, by spray drying. It can also be accompanied with such a dye as exemplified in the first embodiment.

It is preferable to use water as a liquid medium of this embodiment.

The ink of the second embodiment may contain, in addition to the bisphenol sulfonic acid polymer, one or more of the surfactants exemplified in the first embodiment, as a dispersant. The total amount of the surfactant and the bisphenol sulfonic acid polymer is preferably about 0.05 to about 5% by weight, and more preferably about 0.1 to about 3% by weight, based on the total weight of the ink. In order to satisfactorily achieve the advantage of the present invention, i.e. prevention of the undesirable background and improvement of the image density, the amount of the bisphenol sulfonic acid polymer in the sum is preferably equal to or more than about 40% by weight and more preferably equal to or more than about 70% by weight.

The bisphenol sulfonic acid polymer may be applied at the stage of dispersing the pigment, or after the preparation of the ink, namely after dispersing the pigment into the liquid medium using the surfactant aforementioned.

Since the ink according to the second embodiment of the present invention contains the bisphenol sulfonic acid polymer, undesirable background over the non-image area of a print can be prevented. Further, in order to prevent multiple spots of undesirable background, an acetylene glycol surfactant, fatty acid ester, or fatty acid may be added. They can be used individually or in combination.

The acetylene glycol surfactant used is a compound having at least one carbon-carbon triple bond and two hydroxyl groups. Preferably, use can be made of a nonionic acetylene glycol surfactant of the following chemical formula (3):

Chemical Formula (3)

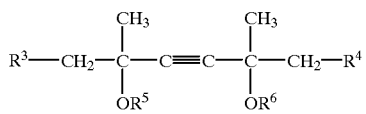

(in which $R^3$ and $R^4$ are $CH_3$—$CH_2$— or $CH_3$—$CH(CH_3)$— and may be the same or different, $R^5$ is —$(CH_2CH_2O)_m$—H, $R^6$ is —$(CH_2CH_2O)_n$—H, and m+n is an integer ranging from 0 to 50). More preferably, 2,4,7,9,-tetramethyl-5-decine-4,7-diol is used in which $R^3$ and $R^4$ are $CH_3$—CH$(CH_3)$— and m+n is 0 in the formula (3). Such a nonioic acetylene glycol surfactant can be commercially available from various manufacturers including Airproducts and Chemicals, Inc. and Kawaken Fine Chemicals Co., Ltd.

The amount of the acetylene glycol surfactant is preferably about 0.01 to about 2% by weight based on the total weight of the ink so as to sufficiently prevent those spots of undesirable background. If the amount is too high, there is a tendency that the coagulated ink dots may became hard to be transferred onto a substrate, thereby decrease the image density.

The amount of fatty acid ester or fatty acid is preferably about 0.5 to about 1.5% by weight based on the total weight of the ink. If the amount is less than about 0.5% by weight, the prevention of such spots of undesirable background may tend to be decreased. On the contrary, if the amount is more than about 1.5% by weight, fatty acid ester or fatty acid may not sufficiently be dissolved in but separated from the ink.

The acetylene glycol surfactant, fatty acid ester, or fatty acid can be added to the ink according to a known technique. For example, the mixing may be done during the production of the ink or immediately before start up of the printing operation.

The pH of the ink of the second embodiment is preferably in a range from about 3 to about 8 and more preferably in a range from about 3 to about 6 when measured at 25° C. When the pH is within such a range, the density of the coagulated ink transferred onto a substrate can sufficiently be secured. The pH of the ink may be adjusted using such known acids and alkalis exemplified in the first embodiment.

For securing a sufficient density of the coagulated ink and improving the operation efficiency during the production of the ink and the printing operation using the ink, the viscosity of the ink produced is preferably in a range from about 100 to about 1500 mPa·s at 30° C. The viscosity of the ink can be adjusted by arbitrary changing the type and amount of the ingredients mentioned above.

A preferred ink of this embodiment is consists essentially of an aqueous liquid dispersion with a pH of about 3 to about 6 and containing, on the basis of the total weight of the ink, about 4 to about 15% by weight of an anionic acrylamide polymer, about 4 to about 20% by weight of a pigment, about 5 to about 10% by weight of alkali metal halide, about 60 to about 80% by weight of water, about 0.1 to about 5% by weight of bisphenol sulfonic acid polymer, about 0.01 to about 0.3% by weight of polyaminocarboxylic acid or a salt thereof, and about 0.01 to about 2% by weight of a biocidal agent (which will be described later).

Next, an ink according to a third embodiment of the present invention will be described in more detail.

The ink of this embodiment is an electrocoagulation printing ink containing at least an electrolytically coagulable polymer, a soluble electrolyte, a pigment, and a liquid medium. The ink is characterized in which a particle size of the pigment at 50% of the volume accumulation is 0.3 to 2 μm when dispersed in the ink, and its particle distribution shows that a proportion of the particles with a particle size not greater than 0.2 μm is equal to or less than 25% by weight, thereby preventing an undesirable background on non-image areas of a print and improving the quality of the print.

If the particle size of the pigment at 50% of the volume accumulation when dispersed is smaller than 0.3 μm, non-coagulated portions of the ink can not be removed enough by a squeegee and remain as an undesirable background. When the particle size of the pigment at 50% of the volume accumulation when dispersed exceeds 2 μms, image density or color development of the pigment can be declined, or streaks of coarse particle may cause, so that it is not possible to provide an image in which colors are clearly reproduced. Also, when the proportion of the pigment particle with a diameter of equal to or less than 0.2 μm in the particle distribution exceeds 25% by weight, non-coagulated portions of the ink can not be removed enough from the surface of the positive electrode, thereby forming undesirable background on the print.

The electrolytically coagulable polymer used preferably in this embodiment is identical to that of the first or second embodiment exemplified above and its preferred weight average molecular weight and amount are also equal to those explained with the second embodiment.

The soluble electrolyte used preferably in this embodiment is identical to that of the first embodiment and its preferred amount is equal to that of the second embodiment.

The pigment used preferably in this embodiment is identical to that of the first embodiment and its preferred amount is equal to that of the second embodiment. More specifically, the pigment may arbitrarily be selected from, but not limited to, organic and inorganic pigments generally used in known printing inks, coatings, and recording agents. The particle size of the pigment at 50% of the volume accumulation when dispersed in the ink is 0.3 to 2 μm and the proportion of its particles with a particle size equal to or less than 0.2 μm in the particle distribution is equal to or less than 25% by weight. The particle size of the pigment at 50% of the volume accumulation when dispersed is preferably about 0.5 to about 1 μm, and the proportion of the particles having a particle size equal to or less than 0.2 μm is preferably not exceed 10% by weight.

It is noted that the particle size of the pigment at 50% of the volume accumulation is a particle diameter (a center diameter or a median diameter) provided that the accumulated volume of the pigment particles is one-half of the total volume.

The particle size of the pigment when dispersed may be adjusted to such a desired level by controlling the size of a milling media of a dispersing machine, packing density of milling media, treating time for dispersion, discharging speed of the pigment dispersion and viscosity of the pigment dispersion, the type of a dispersant explained later, and the like. It is assumed that pigment aggregates of higher order are dispersed into the ink, so that the pigment particles in the ink are present as a mixture of primary particles, secondary particles, and their soft aggregates.

It is preferable to use water as a liquid medium in the ink of this embodiment.

The ink of this embodiment may also include a dispersant for dispersing the pigment. Preferred examples of the dispersant are expressed by the formula (1) or the formula (2) explained with the first and second embodiments. The amount of the dispersant is preferably about 0.02 to about 0.6 g, and more preferably about 0.04 to about 0.4 g, based on 1 $cm^3$ of the pigment volume. When the amount is within such a preferred range, the viscosity stability, the color development, and the re-solubility of the ink are enhanced while the pigment particles are fully coated with the dispersant to give a hydrophilic property to their surface and weaken its affinity with an oily substance contained in a coating agent applied onto the surface of the positive electrode, allowing the non-coagulated portions of the ink to be easily removed from the surface of the positive electrode and further preventing the undesirable background. Also, the dispersion of the pigment in an entirety of the electrocoagulation printing ink can be improved and the particles of the pigment can efficiently be dispersed to a desired size in this embodiment, thereby enhancing the image density of the print. Moreover, as the dispersion stability of the particles is maintained, the pigment is free of re-aggregation when mixed with the electrolytically coagulable polymer and the soluble electrolyte, and the print is free of declination in the image density and streaks. If the amount of the dispersant is excessive, the surface active effect of the dispersant may cause declination in the surface tension of the ink and form undesirable background, increase the ink viscosity, or produce foaming in the ink.

In the above-described, the surface area of the pigment particle may generally be calculated from a specific surface area with $N_2$ or $CO_2$ gas absorption. However, considering that the pore size in the pigment surface is different depending on the type of the pigment, and that the surface area calculated from gas absorption becomes greater in view of the pigment dispersion since the conformation area of the gas is smaller than the size of dispersant, the amount of the dispersant in this embodiment is determined by using the volumetric conversion instead of the conversion per surface area of the pigment.

The ink of this embodiment is free of undesirable background over the non-image areas by controlling the particle size of the pigment when dispersed, however apart from such undesirable background over the print, there are cases in which some spots of undesirable background may be formed. For preventing such spots of undesirable background, the acetylene glycol surfactant, the fatty acid ester, and the fatty acid explained with the second embodiment may be added. They can be used individually or in combination.

Preferable values of the pH and the viscosity as well as a particularly preferable example of the composition of the ink according to the third embodiment are equal to those described with the second embodiment.

It is clearly understood that there can be provided any combination of the feature of the ink of the first embodiment and the feature of the ink of the second embodiment and/or the feature of the ink of the third embodiment, as well as any combination of the feature of the ink of the second embodiment and of the third embodiment. Thereby it so follows that an ink can have effects accrued from those characteristics. For example, a type of ink can be provided having a characteristic level of the electrocoagulability defined by the first embodiment and also containing the bisphenol sulfonic acid polymer defined by the second embodiment and/or the pigment with a desired particle diameter defined by the third embodiment. Alternatively, an ink can be provided containing the bisphenol sulfonic acid polymer defined by the second embodiment and the pigment with a desired particle diameter defined by the third embodiment.

Other components which may be added to the ink according to the first, second, or third embodiment of the present invention will be explained.

The ink of any of the above mentioned embodiments may contain a metal ion sequestering agent for complexing metal ions released from the positive electrode during electrocoagulation printing. Multivalent metal ions are an essential component for forming the coagulated ink dots in the electrocoagulation printing. But on the other hand, the multivalent metal ions may chemically bond with the electrolytically coagulable polymer in the ink before the electrocoagulation of the ink, thereby increasing the viscosity of the ink. The viscosity of the ink increases depending on the concentration of these metal ions. Accordingly, if the multivalent metal ions are excessive in the ink, the ink may be turned to a gel state before electrolytically coagulated. More specifically, if the concentration of the multivalent metal ions, for example, trivalent iron ions, exceeds about 25 ppm, the ink may be too viscous for proper working and, at about 140 ppm, the ink may cause gelation.

The multivalent metal ions may be contained in a ingredient of the ink or may be introduced into the ink during the manufacturing process of the ink. Or, they can be introduced as a contaminant in the collected ink. Namely, after electrocoagulation, the non-coagulated portions of the ink are removed from the surface of the positive electrode and returned back to an ink feeding means for reuse. However, since the collected non-coagulated ink contains a small amount of the coagulated ink, the ink is contaminated with the multivalent metal ions released from the surface of the positive electrode. The concentration of these multivalent metal ions in the ink may increase in time during electrocoagulation printing.

For preventing such an increase of the ink viscosity, the ink of the present invention may contain a sequestering agent in such an amount which can maintain the concentration of the multivalent metal ions equal to or less than about 20 ppm and preferably equal to or less than about 15 ppm. If the amount of the sequestering agent is too large, some of them may still remain complex formable in the ink after they have converted most of the multivalent metal ions to complexes. During the electrocoagulation, the residue of the sequestering agent may complex the multivalent metal ions which are released from the positive electrode and essential for the formation of the coagulated ink dots, thereby hindering the crosslinking of the electrolytically coagulable polymer and decreasing the electrocoagulability. From such point of view, an amount of the sequestering agent needs to be controlled. The addition of the sequestering agent to the ink may be carried out by a known manner, for example, during the production of the ink or, just before or during the printing operation.

In the case of long term electrocoagulation printing, the amount of the multivalent metal ions in the ink increases in contrast to the case of short term printing. Hence it is preferable that the amount of the sequestering agent added is varied between the ink used for the starting of a continuous printing (a starting ink) and the ink added to the starting ink during printing for replenishing (a replenishing ink). Namely, a larger amount of the sequestering agent can be applied to the replenishing ink than to the starting ink.

The amount of the metal ion sequestering agent depends on the concentration of the multivalent metal ions in the ink, the type of the sequestering agent employed, and also the type and the amount of the electrolytically coagulable polymer in the ink, and may not be determined in a uniform manner. In general, the amount of the sequestering agent is preferably about 0.01 to about 0.3% by weight based on the total weight of the ink. When the ink is used as the starting ink, the amount of the sequestering agent is preferably 0 to about 0.2% by weight, and more preferably about 0.01 to about 0.15% by weight, based on the total weight of the ink. On the other hand, when the ink is used as the replenishing ink which needs to complex the multivalent metal ions increased during the printing operation, the amount of the sequestering agent is preferably about 0.05 to about 0.3% by weight, and more preferably about 0.1 to about 0.3% by weight, based on the total weight of the ink.

For its stable bonding with metal ions, the sequestering agent is preferably a compound capable of forming ring structures incorporating metal ions as central metal atoms. Examples of the preferable sequestering agent include polyaminocarboxylic acids such as ethylenediamine-tetraacetic acid (EDTA), iminodiacetic acid (IDA), hydroxyethylimino-diacetic acid (HIDA), ethylene-bis(hydroxyphenyl)glycine (EHPG), hydroxyethyl-ethylenediamine-triacetic acid (HEDTA), nitrilo-triacetic acid (NTA), ethylene-bis(oxyethylenenitrilo)tetraacetic acid (EGTA), cyclohexanediamine-tetraacetic acid (CyDTA), diethylenetriamine-pentaacetic acid (DTPA), and triethylenetetraamine-hexaacetic acid (TTHA), and their salts. They can be used individually or in combination.

The ink of the present invention may contain other ingredients if desired. For example, a biocidal agent for preventing the growth of bacteria, molds and the like. Preferable examples of the biocidal agent are sodium dehydroacetate, sodiumbenzoate, sodiumpyridinethion-1-oxide, zinc pyridinethion-1-oxide, and amine salts of 1,2-benzisothiazoline-3-one or 1-benzisothiazoline-3-one. They may be used individually or in combination. For example, use can be made of a biocidal agent sold by Gray Products under the trademark PARMETOL K-50. The amount of the biocidal agent is preferably about 0.01 to about 2.0% by weight based on the total weight of the ink.

Other than the above components, various additives such as infrared-ray absorbing agents, UV-ray absorbing agents, fragrances, antioxidants, anti-foaming agents, silane coupling agents, plasticizers, flame retardants, moisture retentive agents, organic solvents, and others may be added if necessary.

The printing ink of the present invention is manufactured by mixing, dissolving and uniformly dispersing the aforementioned components. For the dispersion, a generally used dispersing machine such as roller mill, ball mill, pebble mill, attritor, and sand mill can be used. In particular, sand mill is preferably used for the efficiency of dispersion. In the case where bulk particles or bubbles are contained in ink, it is desirable to remove them by filtration, deaeration and the like, since they may hinder electrocoagulation of the ink and decrease an image quality.

A method of the electrocoagulation printing according to the present invention will then be described.

The method of the electrocoagulation printing according to the present invention involves an entire printing process for implementing the electrocoagulation printing using the ink of the present invention, including forming an image by the electrocoagulation of the ink and transferring the image onto a substrate to be printed. The process comprises at least the following steps (c), (d), and (f) and preferably includes all the steps (a) to (f):

(a) cleaning step: cleaning the surface of the positive electrode (a revolving cylinder);

(b) coating step: coating the surface of the positive electrode with micro droplets of a coating agent which contains an oily substance;

(c) filling step: filling the gap defined between the positive and negative electrodes with the electrocoagulation printing ink;

(d) coagulating step: applying a voltage between the positive electrode and selected ones of the negative electrodes to produce dots of coagulated ink representative of a desired image on the surface of the positive electrode;

(e) removing step: removing any remaining non-coagulated ink from the surface of the positive electrode;, and (f) transferring step: contacting the dots of coagulated ink with a substrate to cause a transfer of the dots of coagulated ink onto the substrate and thereby imprint the substrate with the image.

In the electrocoagulation of the ink at the coagulating step (d), multivalent metal ions released from the surface of the positive electrode are trivalent iron ions or trivalent aluminum ions when the positive electrode is made of stainless steel or aluminum.

The coating agent for coating the surface of the positive electrode at the step (b) is applied to the surface of the positive electrode prior to the electrocoagulation of the ink so that the coagulated ink can easily be transferred from the surface of the positive electrode to a substrate. It contains an oily substance such as unsaturated fatty acid, unsaturated plant oil, fatty acid monoester, isostearic acid, silicon oil, and nonionic surfactant having ethylene oxide chains. The coating agent may also contain a metal oxide for controlling the viscosity.

The electrocoagulation printing may be carried out using such an electrocoagulation printing apparatus as schematically shown in FIG. 1. The electrocoagulation printing apparatus 1 has a base plate 5 mounted on a plurality of foot section 3. A plurality of frames 7 extending vertically is mounted on the base plate 5. A pair of vertical plates 9 is disposed at the upper portions of the frames 7. A revolving cylindrical positive electrode 11, which can be freely rotated by a driving motor (not shown), is sandwiched between the paired vertical plates 9. The positive electrode 11 extends in a direction vertical to the paper in FIG. 1 and involves a passivated surface consisting of a passive oxide film.

The electrocoagulation printing apparatus 1 also comprises; a coating means 13 along the positive electrode 11 for applying a coating agent over the surface of the positive electrode 11 to form micro droplets of the coating agent on the positive electrode surface; an ink supplying means 15 provided with a temperature adjusting means (not shown) for supplying the ink of the present invention onto the positive electrode; a printing head 19 having negative electrodes 17 which form, on the surface of the positive electrode, a plurality of dots of coagulated ink representative of a desired image to be printed; and a removing means 21 such as a squeegee, for removing non-coagulated portions of the ink from the surface of the positive electrode. In addition, a pressure roller 23 is provided as a means for contacting the dots of coagulated ink produced on the surface of the positive electrode and representative of the desired image with a substrate W to cause a transfer of the dots from the surface of the positive electrode onto the substrate W for printing the image thereon.

For example, the positive electrode 11 is made of stainless steel or aluminum, the non-coagulated ink removing means 21 is a soft polyurethane squeegee, and the pressure roller 23 is made of polyurethane. The distance between the positive electrode 11 and the negative electrodes 17 is preferably about 50 to about 100 µm.

Provided below the positive electrode 11 is a cleaning means 25 which is equipped with a temperature adjusting means (not shown) and arranged f or cleaning the positive electrode surface in order to remove any remaining coagulated ink which has not been transferred but left on the positive electrode surface, non-coagulated ink, and the coating agent from positive electrode surface.

According to such a structure, the coating agent is applied over the surface of the revolving positive electrode 11 with the coating means 13 to produce micro droplets on the surface of the positive electrode 11. The ink of the present invention is then supplied by the ink supplying means 15 to the gap defined between the positive electrode 11 and the negative electrodes 17, in which the latter 17 are spaced from the former 11 by a constant predetermined distance (gap). The supplied ink forms dots of coagulated ink by electrical energization of the positive electrode and selected ones of the negative electrodes. Non-coagulated portion of the ink is then removed from the surface of the positive electrode 11 by the removing means (squeegee) 21.

Then, the dots of coagulated ink formed on the surface of the positive electrode 11 are contacted with a substrate W at the position between the positive electrode 11 and the pressure roller 23 so as to transfer the dots onto the substrate W and thereby imprint the substrate W.

A multicolor printing can be achieved by providing a required number of electrocoagulation printing apparatuses similar to that shown in FIG. 1 corresponding to the number of desired colors, producing on respective positive electrode surfaces of the printing apparatuses several desired color images of coagulated ink, and transferring the images of desired colors at respective transfer positions onto the substrate W in superimposed relation to provide a polychromic image thereon. For instance, process printing can be carried out by arranging four electrocoagulation printing apparatuses 1 shown in FIG. 1 in tandem for printing sequentially using yellow, cyan, red, and black.

A center drum type printing apparatus such as disclosed in U.S. Pat. No. 5,538,601 can be used as the electrocoagulation printing apparatus employing the ink of the present invention. The patented apparatus has a system in which a desired number of printing units, each the unit comprising a cleaning means, a coating means, an ink supplying means, a plurality of negative electrodes spaced by a predetermined distance from the positive electrode, a removing means, and a transferring means (a pressure roller), are arranged around a rotatable cylindrical positive electrode having a passivated surface. For instance, four of the printing units are arranged around the cylindrical positive electrode for printing sequentially using yellow, cyan, red, and black ink.

The substrate to be printed is selected from most preferably non-coated printing paper and coated printing paper (coated sheets, art sheets, cast coated sheets, etc.). A variety of water absorbable sheets in which a substrate of a plastic material is coated with an image receiving layer may also preferably be used. The image receiving layer is, but not limited to, a water absorbable resin layer made of polyvinyl alcohol, polyvinyl pyrrolidone, polyacrylamide, and the like for absorption of an aqueous type of the electrocoagulation printing ink.

The print of the present invention is a printed matter using the ink of the present invention on a substrate such as the one mentioned above. The print of the present invention is preferably produced with the use of, but not limited to, the electrocoagulation printing method described previously.

The present disclosure relates to subject matter contained in Japanese Patent Application No. HEI 11-74327, filed on Mar. 18, 1999, No. HEI 11-89952, filed on Mar. 30, 1999, and No. HEI 11-131598, filed on May 12, 1999, the disclosure of which is expressly incorporated herein by reference in its entirety.

EXAMPLE

The present invention will be described in more detail in conjunction with some examples, but is not limited to the examples, without departing from the spirit of the present invention. In the examples, the unit "percent by weight" is denoted by "%". The measurements were conducted as follows: a pH was measured at 25° C. with a glass electrode hydrogen ion densitometer manufactured by Electrochemical Industry; a viscosity was measured at 30° C. with a Tokimech's B-type viscometer; a weight average molecular weight was measured by GPC method with polyethylene glycol conversion; an electric conductivity was measured at 25° C. with a Horiba's conductivity meter DS-12; an optical density was measured with a device, X-rite model 408, a trademark of X-Rite; and a particle diameter of the pigment in the ink was measured with a dynamic light diffusion type particle size distribution meter, Microtrac model 9340-UPA manufactured by Nikki.

1. Demonstration for Electrocoagulability of the Ink
(1) Synthesis of Electrolytically Coagulable Polymers
[Synthesis of Polymer A]

669 g of ion exchange water, 95.5 g of acrylamide, 4.5 g of acrylic acid, and 0.2 g of hypophosphorous acid were poured in a 2 L separable 4-outlet flask equipped with a stirrer, a nitrogen introducing tube, and a cooling conduit and stirred for 30 minutes under a nitrogen gas atmosphere to proceed the nitrogen substitution. They were then heated to 50° C. and have 0.4 g of an ammonium persulfate admixed thereto for starting the reaction. They were heated to 80° C., mixed with 0.6 g of an azo polymerization initiator (V-50 by Wako Pure Chemicals Industries, Ltd.), and reacted for 5 hours to synthesize a polymer A. Using ion exchange water and potassium hydroxide or hydrochloric acid, the polymer A was adjusted to have solids of 12% and a pH of 4.0. It was found that the viscosity of an obtained aqueous solution was 1700 mPa·s, the weight average molecular weight of the polymer A was 250,000, and the acid value was 30 mgKOH/g.

[Synthesis of Polymers B, C, and E to J]

In the same manner as the synthesis of the polymer A, a respective one of polymers B, C, and E to J was synthesized using corresponding ingredients listed in Table 1. The resulting measurements are also shown in Table 1.

[Synthesis of Polymer D]

500 g of aqueous solution of the polymer C obtained above was mixed with 2.0 g of potassium hydroxide and heated at 80° C. for 2 hours to promote hydrolysis of the polymer C so as to synthesize a polymer D. Using ion exchange water and hydrochloric acid, the polymer D was adjusted to have solids of 12% and a pH of 4.0. The resulting measurements are shown in Table 1.

TABLE 1

Polymer Syntheses

| | Polymer A | Polymer B | Polymer C | Polymer D | Polymer E | Polymer F | Polymer G | Polymer H | Polymer I | Polymer J |
|---|---|---|---|---|---|---|---|---|---|---|
| Water (g) | 669.0 | 669.0 | 669.0 | Hydrolysis of Polymer C | 614.0 | 669.0 | 950.0 | 669.0 | 669.0 | 669.0 |
| Acrylamide (g) | 95.5 | 75.0 | 100.0 | | — | 97.5 | 49.0 | 96.9 | 73.0 | 89.0 |
| Acrylic acid (g) | 4.5 | 25.0 | — | | 100.0 | 2.5 | 1.0 | 3.1 | 27.0 | 11.0 |
| Monomer concentration (wt %) | 13.0 | 13.0 | 13.0 | | — | 13.0 | 5.0 | 13.0 | 13.0 | 13.0 |
| Hypophosphorous acid (g) | 0.2 | 0.2 | 0.2 | | — | 1.1 | 0.03 | 0.1 | 0.2 | 1.1 |
| Ammonium persulfate (g) | 0.4 | 0.4 | 0.4 | | 0.4 | 0.4 | 0.4 | 0.4 | 0.4 | 0.4 |
| V-50 (g) | 0.6 | 0.6 | 0.6 | | 0.8 | 0.6 | 0.6 | 0.6 | 0.6 | 0.6 |
| Finished pH | 4.0 | 4.0 | 4.0 | 4.0 | 2.3 | 4.0 | 4.0 | 4.0 | 4.0 | 4.0 |
| Finished solids (wt %) | 12.0 | 12.0 | 12.0 | 12.0 | 12.0 | 12.0 | 3.0 | 12.0 | 12.0 | 12.0 |
| Finished viscosity (mPa.s) | 1700.0 | 970.0 | 2400.0 | 2100.0 | 940.0 | 140.0 | 950.0 | 2430.0 | 2100.0 | 160.0 |
| Acid value (mgKOH/g) | 30.0 | 190.0 | 0.0 | 70.0 | 770.0 | 20.0 | 15.0 | 24.0 | 218.0 | 83.0 |
| Weight average molecular weight | 250000.0 | 140000.0 | 320000.0 | 320000.0 | 710000.0 | 70000.0 | 1500000.0 | 650000.0 | 220000.0 | 90000.0 |

(2) Preparation of the Ink

EXAMPLE 1

A black ink was prepared, using the following ingredients:

| | |
|---|---|
| Polymer A aqueous solution (12% solids) | 73.3% |
| Carbon black pigment | 8.8% |
| (Carbon Black Monarch 120 by Cabot Corp.) | |
| Anionic dispersant aqueous solution (about 42% effective components) | 0.75% |
| (Closperse 2500 by Boehme Filatex Canada Inc.) | |
| Potassium chloride | 8.8% |
| Disodium EDTA dihydrate | 0.03% |
| Biocidal agent | 0.1% |
| (Parmetol K 50 by Gray Products) | |
| Demineralized water | 8.22% |
| Total | 100% |

The pigment was first dispersed into water with the dispersant aqueous solution, and by use of a sand mill, to produce a pigment dispersion. The polymer A aqueous solution was then added to the resulting pigment dispersion and mixed with the potassium chloride and the disodium EDTA dihydrate and then the biocidal agent. Using hydrochloric acid or sodium hydroxide, the mixture was adjusted to have a pH of 4.2. An obtained printing ink had an electric conductivity of 114 mS/cm, a specific gravity of 1.1, and a viscosity of 500 mPa·s.

The electrocoagulability of the ink was then measured. The ink was supplied to a gap of 50 μm between the positive and negative electrodes in which both the electrodes were made of stainless steel. Then, a voltage of 50 V was applied between the positive and negative electrodes by a capacitor of 51.2 μF to promote the electrocoagulation of the ink. Both the electrodes were rinsed with pure water and an obtained electrocoagulum was collected. The dry weight of the electrocoagulum was measured to determine the electrocoagulability by its ratio to the dry weight of the ink supplied. It was then found that the electrocoagulability was 8.7% at 0.09 seconds of the time constant (T1). It was repeated with the exception that the capacitor was 12.8 μF. The electrocoagulability at 0.02 seconds of the time constant (T2) was 2.9%. A calculation list of the time constants T1 and T2 is shown in Table 2.

EXAMPLES 2 TO 9 and COMPARATIVE EXAMPLES 1 TO 4

In the same manner as Example 1, ink samples according to Examples 2 to 9 and Comparative Examples 1 to 4 were prepared using corresponding ingredients listed in Table 3. The resulting measurements are also shown in Table 4.

TABLE 2

Calculations of Time Constant

| | Examples | | | | | | | | | Comparative Examples | | | |
|---|---|---|---|---|---|---|---|---|---|---|---|---|---|
| | 1 | 2 | 3 | 4 | 5 | 6 | 7 | 8 | 9 | 1 | 2 | 3 | 4 |
| Electric conductivity (mS/cm) | 114 | 110 | 114 | 91 | 180 | 110 | 116 | 90 | 120 | 120 | 115 | 110 | 105 |
| Gap between positive and negative electrodes (μm) | 50 | 52 | 50 | 63 | 32 | 52 | 50 | 63 | 48 | 48 | 50 | 52 | 54 |

TABLE 2-continued

Calculations of Time Constant

|  | Examples | | | | | | | | | Comparative Examples | | | |
| --- | --- | --- | --- | --- | --- | --- | --- | --- | --- | --- | --- | --- | --- |
|  | 1 | 2 | 3 | 4 | 5 | 6 | 7 | 8 | 9 | 1 | 2 | 3 | 4 |
| Resistance (kΩ) | 1.75 | 1.75 | 1.75 | 1.74 | 1.74 | 1.75 | 1.72 | 1.76 | 1.74 | 1.74 | 1.74 | 1.75 | 1.76 |
| Time constant T1 (sec)*1 | 0.0898 | 0.0895 | 0.0898 | 0.0893 | 0.0889 | 0.0895 | 0.0881 | 0.0901 | 0.0891 | 0.0889 | 0.0890 | 0.0895 | 0.0903 |
| Time constant T2 (sec)*2 | 0.0225 | 0.0224 | 0.0225 | 0.0223 | 0.0222 | 0.0224 | 0.0220 | 0.0225 | 0.0223 | 0.0222 | 0.0223 | 0.0224 | 0.0226 |

Note 1: Time constant at Capacitor C1 = 51.2(μF)
Note 2: Time constant at Capacitor C2 = 12.8(μF)

TABLE 3

Ink Compositions

| /Weight % | Examples | | | | | | | | | Comparative Examples | | | |
| --- | --- | --- | --- | --- | --- | --- | --- | --- | --- | --- | --- | --- | --- |
|  | 1 | 2 | 3 | 4 | 5 | 6 | 7 | 8 | 9 | 1 | 2 | 3 | 4 |
| Polymer A Aqueous solution | 73.30 | | | | | | | | | | | | |
| Polymer B Aqueous solution | | 73.30 | | | | | | | | | | | |
| Polymer C Aqueous solution | | | | | | | | | | 73.30 | | | |
| Polymer D Aqueous solution | | | 76.30 | 76.30 | 75.22 | | | | | | 76.30 | | |
| Polymer E Aqueous solution | | | | | | | | | | | | 73.30 | |
| Polymer F Aqueous solution | | | | | | | | | | | | | 73.30 |
| Polymer G Aqueous solution | | | | | | 81.62 | | | | | | | |
| Polymer H Aqueous solution | | | | | | | 73.30 | | | | | | |
| Polymer I Aqueous solution | | | | | | | | 73.30 | | | | | |
| Polymer J Aqueous solution | | | | | | | | | 73.30 | | | | |
| Carbon black | 8.80 | 8.80 | 8.80 | 8.80 | 8.80 | 8.80 | 8.80 | 8.80 | 8.80 | 8.80 | 8.80 | 8.80 | 8.80 |
| Dispersant Aqueous solution | 0.75 | 0.75 | 0.75 | 0.75 | 0.75 | 0.75 | 0.75 | 0.75 | 0.75 | 0.75 | 0.75 | 0.75 | 0.75 |
| Potassium chloride | 8.80 | 8.80 | 8.40 | 6.20 | 15.20 | 8.80 | 8.60 | 8.40 | 8.60 | 9.60 | 8.80 | 8.80 | 8.80 |
| EDTA2Na · 2Hydrate | 0.03 | 0.03 | 0.03 | 0.03 | 0.03 | 0.03 | 0.03 | 0.03 | 0.03 | 0.03 | 0.03 | 0.03 | 0.03 |
| Biocidal agent | 0.10 | 0.10 | 0.10 | 0.10 | | | 0.10 | 0.10 | 0.10 | 0.10 | 0.10 | 0.10 | 0.10 |
| Water | 8.22 | 8.22 | 5.62 | 7.82 | | | 8.42 | 8.62 | 8.42 | 7.42 | 5.22 | 8.22 | 8.22 |
| Total | 100.00 | 100.00 | 100.00 | 100.00 | 100.00 | 100.00 | 100.00 | 100.00 | 100.00 | 100.00 | 100.00 | 100.00 | 100.00 |

TABLE 4

Results

|  | Examples | | | | | | | | | Comparative Examples | | | |
| --- | --- | --- | --- | --- | --- | --- | --- | --- | --- | --- | --- | --- | --- |
|  | 1 | 2 | 3 | 4 | 5 | 6 | 7 | 8 | 9 | 1 | 2 | 3 | 4 |
| Viscosity (mPa.s) | 500 | 210 | 650 | 540 | 1100 | 440 | 500 | 210 | 650 | 720 | 690 | 340 | 120 |
| Electric conductivity (mS/cm) | 114 | 110 | 114 | 91 | 180 | 110 | 116 | 90 | 120 | 120 | 115 | 110 | 105 |
| PH | 4.2 | 3.5 | 5.8 | 4.2 | 4.2 | 4.2 | 4.0 | 3.7 | 4.0 | 4.0 | 2.0 | 4.2 | 4.4 |
| Electro-coagulability (%) | | | | | | | | | | | | | |
| Time constant 0.02sec; A | 2.9 | 4.7 | 3.4 | 3.1 | 4.8 | 2.2 | 1.8 | 2.9 | 1.7 | 0.0 | 0.0 | 4.7 | 0.6 |
| Time constant 0.09sec; B | 8.7 | 7.1 | 7.4 | 6.5 | 9.3 | 4.5 | 5.3 | 4.8 | 4.8 | 0.0 | 0.1 | 5.6 | 3.4 |
| Ratio (A:B) | 1:3.0 | 1:1.5 | 1:2.2 | 1:2.1 | 1:1.9 | 1:2.0 | 1:2.9 | 1:1.7 | 1:2.8 | — | — | 1:1.2 | 1:5.7 |
| Optical density In Intermediate region (OD value) | 0.48 | 0.61 | 0.54 | 0.52 | 0.69 | 0.40 | 0.34 | 0.49 | 0.32 | 0.00 | 0.05 | 0.62 | 0.17 |

TABLE 4-continued

|  | Results | | | | | | | | | | | | |
|---|---|---|---|---|---|---|---|---|---|---|---|---|
|  | Examples | | | | | | | | | Comparative Examples | | | |
|  | 1 | 2 | 3 | 4 | 5 | 6 | 7 | 8 | 9 | 1 | 2 | 3 | 4 |
| Optical density In Shadow region (OD value) | 1.36 | 1.25 | 1.27 | 1.13 | 1.57 | 0.85 | 0.91 | 0.88 | 0.86 | 0.00 | 0.14 | 0.83 | 0.60 |
| Gradation reproducibility (by visual observation) | Y | Y | Y | Y | Y | Y | Y | Y | Y | N | N | N | M-N |

(3) Electrocoagulation Printing

Using a type of the electrocoagulation printing apparatus shown in FIG. 1, electrocoagulation printing was conducted using the ink of Examples and Comparative Examples. The cylindrical positive electrode made of a stainless steel and a plurality of the negative electrodes having a diameter of 50 $\mu$m were provided. The distance between the positive and negative electrodes was set to 50 $\mu$m using a clearance gage. The ink as well as a cleaning liquid supplied to a cleaning device for cleaning the positive electrode was warmed to 40° C. to carry out the electrocoagulation printing, with the ink and the positive electrode temperatures maintained at 40° C. As the level of the ink in the ink feeder diminished, the ink was replenished to maintain a constant ink level. The substrate to be printed was a synthetic paper (Tezlyn by PPG Industry).

The optical densities in a shadow region (voltage applied for 4 $\mu$sec) and in an intermediate region (voltage applied for 1 $\mu$sec) of the print were measured. Also, the gradation reproducibility was visually evaluated according to the following ratings:

Y: The gradation from higher to lower density is sufficient and expressed very smoothly.

M: The gradation from higher to lower density is slightly insufficient or lacks smoothness, and the gradation reproducibility is not very good.

N: The gradation from higher to lower density is slight and the gradation reproducibility is poor.

The resulting ratings are shown in Table 4.

As apparent from Table 4, the ink of Examples 1 to 9 in which the ratio (A:B) was 1:1.5 to 1:3.0 exhibited a sufficient difference in OD between the shadow region and the intermediate region of the print (difference in OD approximately equal to or more than 0.4) thus providing a suitable degree of the gradation reproducibility. Examples 1 to 5, in which the electrocoagulability (A) was equal to or more than 2% and the electrocoagulability (B) was equal to or more than 5%, exhibited both a sufficient degree of the gradation reproducibility and a suitable level of the image density. In contrast to this, Examples 6 to 9, failing to have such electrocoagulability characteristics, exhibited a sufficient degree of the gradation reproducibility but a slightly deficient level of the image density.

On the contrary, the ink of Comparative Examples 1 to 4 which had the electrocoagulability ratio not falling in the above range (1:1.5 to 1:3.0) showed the following results: the ink of Comparative Example 1 formed no electrocoagulation and could not produce a print; the ink of Comparative Examples 2 and 3 provided insufficient degrees of the gradation reproducibility and could not express a clear gradation; and the ink of Comparative Example 4 exhibited no smoothness of the gradation from highlight to shadow while expressing the gradation from intermediate to shadow, thus with a result that the gradation reproducibility was visually inferior.

2. Demonstration for Dispersant in the Ink
(1) Preparation of the Ink

Ink samples according to Examples 10 to 17 and Comparative Examples 5 to 8 were prepared using corresponding ingredients listed in Table 5. The bisphenol sulfonic acid polymer was selected from: Visperse P-125 (bisphenol S sulfonic acid polymer), a trademark of Nippon Paper Industries Co., Ltd., 10,000 weight average molecular weight); or Visperse P-215 (bisphenol A sulfonic acid polymer), a trademark of Nippon Paper Industries Co., Ltd., 20,000 weight average molecular weight).

The pigment was first dispersed into water by use of a sand mill, using the bisphenol sulfonic acid polymer for Examples 10 to 16, and using Closperse 2500 for Example 17 and Comparative Examples 5 to 8, to produce pigment dispersions respectively. The electrolytically coagulable polymer was added to the resulting pigment dispersion, followed by the addition of potassium chloride and EDTA. For Example 17, the bisphenol sulfonic acid polymer was also applied. Finally, they were mixed with the biocidal agent and demineralized water, and adjusted with hydrochloric acid to have a pH of 4.1. The resulting measurements of the electric conductivity and the viscosity of the inks are shown in Table 5.

TABLE 5

|  |  | Results | | | | | | | | | | | |
|---|---|---|---|---|---|---|---|---|---|---|---|---|
|  | Composition/ | Examples | | | | | | | | Comparative Examples | | | |
|  | Weight % | 10 | 11 | 12 | 13 | 14 | 15 | 16 | 17 | 5 | 6 | 7 | 8 |
| Dispersant | Visperse P-125 | 0.34 | 1.85 | 1.65 | 2.16 | 2.74 | 3.40 |  | 1.02 |  |  |  |  |
|  | Visperse P-215 |  |  |  |  |  | 1.65 |  |  |  |  |  |  |
|  | Closperse 2500[*1] |  |  |  |  |  |  | 4.82 | 0.80 | 4.75 | 4.87 | 6.44 |  |
| Electrolytically coagulable polymer | Accostrength 86 |  | 7.35 |  | 6.25 | 8.20 | 8.14 | 7.83 | 8.18 | 9.61 | 8.10 | 8.27 | 8.21 |
|  | Accostrength 85 | 9.61 |  | 7.83 |  |  |  |  |  |  |  |  |  |

TABLE 5-continued

|  | Composition/ Weight % | Examples 10 | 11 | 12 | 13 | 14 | 15 | 16 | 17 | Comparative Examples 5 | 6 | 7 | 8 |
|---|---|---|---|---|---|---|---|---|---|---|---|---|---|
| Pigment | Carbon black Monarch 120 | 11.67 | | | | | | | | 11.67 | | | |
|  | Permanent Yellow DHG | | 12.38 | | | | | | | | 13.50 | | |
|  | Permanent Rubin F6B | | | 11.22 | | 11.63 | 11.55 | 11.22 | 11.59 | | | | 11.63 |
|  | Hosterperm Blue B2G | | | | 9.20 | | | | | | | | 11.59 |
| Liquid medium | Demineralized water | 68.64 | 68.96 | 70.03 | 72.64 | 68.40 | 67.94 | 70.03 | 65.40 | 68.18 | 64.75 | 66.15 | 64.74 |
| Soluble electrolyte | KCl | 9.61 | 9.33 | 9.13 | 9.62 | 8.89 | 8.83 | 9.13 | 8.86 | 9.61 | 8.77 | 8.95 | 8.89 |
| Sequestering agent | EDTA | 0.03 | 0.03 | 0.03 | 0.03 | 0.03 | 0.03 | 0.03 | 0.03 | 0.03 | 0.03 | 0.03 | 0.03 |
| Biocidal agent | Parmetol K-50 | 0.10 | 0.10 | 0.11 | 0.10 | 0.11 | 0.11 | 0.11 | 0.10 | 0.10 | 0.10 | 0.10 | 0.10 |
| Total | | 100.00 | 100.00 | 100.00 | 100.00 | 100.00 | 100.00 | 100.00 | 100.00 | 100.00 | 100.00 | 100.00 | 100.00 |
| Ph | | 4.1 | 4.1 | 4.1 | 4.1 | 4.1 | 4.1 | 4.1 | 4.1 | 4.1 | 4.1 | 4.1 | 4.1 |
| Electric conductivity (mS/cm) | | 112 | 105 | 104 | #12 | 105 | 106 | 103 | 112 | 1#2 | 105 | 104 | 112 |
| Viscosity (mPa.s) | | 470 | 520 | 490 | 500 | 540 | 560 | 540 | 520 | 490 | 490 | 490 | 500 |
| Dmax (Optical density) | | 1.40 | 1.28 | 1.47 | 1.36 | 1.41 | 1.36 | 1.40 | 1.26 | 1.27 | 1.17 | 1.26 | 1.27 |
| Background (Optical density) | | 0.007 | 0.006 | 0.003 | 0.006 | 0.004 | 0.005 | 0.003 | 0.006 | 0.012 | 0.015 | 0.014 | 0.014 |

Note 1: Aqueous solution with 42.5% of effective component (2) Electrocoagulation Printing Using a type of the electrocoagulation printing apparatus shown in FIG. 1, electrocoagulation printing was conducted using the ink obtained above. The electrocoagulation printing method was identical to that explained in the previous paragraph "1. Demonstration of electrocoagulability in the ink".

The optical densities in a shadow region (Dmax) and in a non-image region (undesirable background) were measured. The Dmax has a numerical value indicating a level of the image density in each color. When the optical density in the non-image region is less than 0.01, it is judged that there is no undesirable background. The results are shown in Table 5.

As apparent from Table 5, the ink of the present invention (Examples 10 to 17) containing the bisphenol sulfonic acid polymer produced a suitable level of the image density (Dmax) and showed no sign of undesirable background in the non-image region of the print. On the contrary, the ink of Comparative Examples 5 to 8 not containing the bisphenol sulfonic acid polymer showed deficient levels of the image density and generated signs of the undesirable background.

3. Demonstration for Particle Diameter of Pigment in the Ink
(1) Preparation of the Ink

EXAMPLE 18

A magenta ink was prepared using the following ingredients:

| | |
|---|---|
| Azo magenta pigment (Permanent Rubin F6B by Clarient) | 11.25% |
| Anionic dispersant (bisphenol sulfonic acid polymer) (Visperse P 125 by Nippon Paper Industries Co., Ltd.) | 1.66% |
| Anionic acrylamide polymer (Accostrength 86 by Mitsui Cytec Ltd.) | 7.64% |
| Potassium chloride | 9.52% |
| Disodium EDTA dihydrate | 0.01% |
| Biocidal agent | 0.05% |
| Demineralized water | 69.87% |
| Total | 100% |

The pigment was first discharged once at 6 kg/minute and dispersed into water using the dispersant, and by use of a sand mill, to produce a pigment dispersion. The polymer was then added to the resulting pigment dispersion and mixed with the potassium chloride and the disodium EDTA dihydrate, followed by the addition of the biocidal agent. Using hydrochloric acid or sodium hydroxide, the mixture was adjusted to have a pH of 4.1. An obtained printing ink had an electric conductivity of 121.1 mS/cm and a viscosity of 604 mPa·s. The specific gravity (based on 1 of water) necessary for calculating the volume of the pigment may be measured by an ASTM D153 method or a method described in "Raw Material Data Handbook" published by the National Printing Ink Research Institute.

It was found that the particle size of the pigment at 50% of the volume accumulation was 0.905 μm and a portion of the particles having a diameter of equal to or less than 0.2 μm in the particle distribution was 0%.

EXAMPLES 19 TO 24 AND COMPARATIVE EXAMPLES 9 TO 12

In the same manner as Example 18, ink samples according to Examples 19 to 24 and Comparative Examples 9 to 12 were prepared under the dispersion conditions shown in Table 6, using corresponding ingredients listed in Table 6.

The measurements of the electric conductivity, the viscosity, the particle size of the pigment at 50% of the volume accumulation, and the proportion of the particles having a diameter of equal to or less than 0.2 μm in the particle distribution are shown in Table 6.

EXAMPLES 25

Example 11 was repeated with the exception that the electrolytically coagulable polymer was 61.25% of the poly-

TABLE 6

Ink Compositions and Results

| | Composition/Weight % | Examples | | | | | | | Comparative Examples | | | |
|---|---|---|---|---|---|---|---|---|---|---|---|---|
| | | 18 | 19 | 20 | 21 | 22 | 23 | 24 | 9 | 10 | 11 | 12 |
| Polymer | Accostrength 86 | 7.64 | 6.17 | 8.76 | 5.72 | 7.12 | 7.64 | 7.33 | 7.54 | 5.94 | 7.95 | 7.64 |
| Pigment | Carbon black Monarch 1200 | | | 8.76 | | | | | | | | |
| | Permanent Rubin F6B | 11.25 | | | | | 11.25 | | 11.10 | | | 11.25 |
| | Lionol Blue FG-7200G | | 9.26 | | 9.26 | | | 9.26 | | | 12.58 | |
| | Lionol Yellow 1919 | | | | | 12.58 | | | | 9.26 | | |
| Dispersant | Visperse P-125 | 1.66 | 2.18 | | | | 1.66 | | | 4.30 | | 1.66 |
| | Closperse 2500 (as solids) | | | 0.11 | 3.30 | 5.48 | | 0.08 | 3.00 | | 1.89 | |
| Liquid medium | Demineralized water | 69.87 | 72.45 | 72.44 | 71.80 | 65.72 | 69.86 | 73.28 | 68.12 | 70.70 | 68.22 | 69.86 |
| Soluble electrolyte | KCl | 9.52 | 9.88 | 9.87 | 9.86 | 9.04 | 9.53 | 9.99 | 10.18 | 9.74 | 9.30 | 9.53 |
| Sequestering agent | EDTA2Na · 2 Hydrate | 0.01 | 0.01 | 0.01 | 0.01 | 0.01 | 0.01 | 0.01 | 0.01 | 0.01 | 0.01 | 0.01 |
| Biocidal agent | Parmetol K-50 | 0.05 | 0.05 | 0.05 | 0.05 | 0.05 | 0.05 | 0.05 | 0.05 | 0.05 | 0.05 | 0.05 |
| | Total | 100.00 | 100.00 | 100.00 | 100.00 | 1a0.00 | 100.00 | 100.00 | 100.00 | 100.00 | 100.00 | 100.00 |
| Dispersing conditions | Dispersant(g)/ Pigment (cm$^3$) | 0.207 | 0.377 | 0.024 | 0.570 | 0.610 | 0.207 | 0.014 | 0.378 | 0.650 | 0.240 | 0.207 |
| | Dispersing machine | Sand mill | Sand mill | Sand mill | Sand mill | Sand mill | Sand mill | Sand mill | Sand mill | Sand mill | Sand mill | Attritor |
| | Dispersing Pass frequency | 1 | 1 | 1 | 1 | 1 | 1 | 1 | 2 | 1 | 2 | 1 |
| | Discharging amount (kg/min.) | 6 | 2 | 5 | 2 | 6 | 10 | 7 | 6 | 4 | 1 | 10 |
| Physical properties of ink | Electric conductivity (mS/cm) | 121.0 | 122.5 | 119.8 | 123.2 | 125.2 | 121.4 | 123.5 | 124.6 | 1223.7 | 119.8 | 121.2 |
| | Viscosity (mPa · s) | 604 | 660 | 622 | 570 | 705 | 540 | 480 | 596 | 590 | 540 | 460 |
| | Particle size of the pigment at 50% of the volume accumulation (μm) | 0.905 | 0.314 | 0.712 | 0.343 | 0.785 | 1.860 | 1.944 | 0.438 | 0.352 | 0.255 | 2.64 |
| | Ratio of particles with a perticle size less than or equal to 0.2 μm (%) | 0 | 24.06 | 20.25 | 22.32 | 1.45 | 0 | 0 | 30.10 | 27.27 | 28.72 | 0 |
| | Dmax (Optical density) | 1.423 | 1.540 | 1.447 | 1.530 | 1.237 | 1.285 | 1.126 | 1.384 | 1.513 | 1.281 | 0.547 |
| | Background (Optical density) | 0.002 | 0.004 | 0.005 | 0.002 | 0.005 | 0.0O1 | 0.003 | 0.018 | 0.128 | 0.082 | 0.003 |

(2) Electrocoagulation Printing

In the same manner as the paragraph "1. Demonstration for Electrocoagulability of the Ink" except that the substrate to be printed was a coated paper, the electrocoagulation printing using the ink of Examples 18 to 24 and Comparative Examples 9 to 12 was performed.

The optical densities in a shadow region (Dmax) and in a non-image region were measured. When the optical density in the non-image region is less than 0.01, it can be judged that there is no sign of the undesirable background. The resulting measurements are also shown in Table 6.

As apparent from Table 6, the ink of the present invention (Examples 18 to 24) containing the pigment with a desired particle size in the dispersion produced a suitable level of the image density (Dmax) and showed neither a sign of undesirable background in the non-image region nor streak in the image region. On the contrary, Comparative Examples 9 to 11 in which the pigment with a particle size of equal to or less than 0.2 μm was over-proportioned caused undesirable background. The ink of Comparative Example 12 in which the particle size of the pigment at 50% of the volume accumulation exceeded a suitable level failed to produce a practically acceptable level of the image density.

4. Demonstration for Electrocoagulability of the Ink, Dispersant, and Particle Diameter of Pigment mer A in Example 1, the water content was 15.06% and the pigment was 12.38% of disazo pigment, Lionol Yellow 1919 manufactured by Toyo Ink Mfg. Co., Ltd.

EXAMPLE 26

Example 21 was repeated with the exception that the electrolytically coagulable polymer was 47.67% of the polymer A in Example 1 and the water content was 29.85%.

EXAMPLE 27

Example 18 was repeated with the exception that the electrolytically coagulable polymer was 63.67% of the polymer A in Example 1 and the water content was 13.83%.

Ink samples according to Examples 25 to 27 were prepared and used for the electrocoagulation printing in the same manner as above Examples. The obtained results are shown in Table 7.

As apparent from Table 7, the resulting printed matters using the ink of Examples 25 to 27 were free of undesirable background and showed a suitable degree of the gradation reproducibility.

It is to be noted that, besides those already mentioned above, many modifications of variations of the above embodiments may be made without departing from the novel and advantageous features of the present invention. Accordingly, all such modifications and variations are intended to be included within the scope of the appended claims.

TABLE 7

Results

| | Examples | | |
|---|---|---|---|
| | 25 | 26 | 27 |
| Ink viscosity (cps) | 460 | 340 | 470 |
| Electric conductivity (mS/cm) | 110 | 116 | 114 |
| PH | 4.3 | 4.0 | 4.2 |
| Electrocoagulation rate (%) | | | |
| Time constant 0.02sec; A | 2.8 | 2.6 | 2.9 |
| Time constant 0.09sec; B | 3.6 | 3.8 | 3.8 |
| Comparison (A:B) | 1:2.9 | 1:4.6 | 1:3.1 |
| Optical density in the Intermediate region (OD value) | 0.38 | 0.35 | 0.42 |
| Optical density in the Shadow region (OD value) | 1.25 | 1.50 | 1.31 |
| Gradation reproducibility (by visual observation) * | Y | Y | Y |
| Particle size of the pigment at 50% of the volume accumulation ($\mu$m) | 0.770 | 0.335 | 1.88 |
| Ratio of particles with a particle size less than or equal to 0.2 $\mu$m (%) | 1.36 | 22.15 | 0.13 |
| Background (OD value) | 0.004 | 0.005 | 0.002 |

* Y : The gradation from higher to lower density is sufficient and expressed very smoothly.

What is claimed is:

1. An electrocoagulation printing ink comprising a bisphenol sulfonic acid polymer, an electrolytically coagulable polymer, a soluble electrolyte, a pigment, and a liquid medium.

2. The electrocoagulation printing in according to claim 1, wherein the bisphenol sulfonic acid polymer has the general formula:

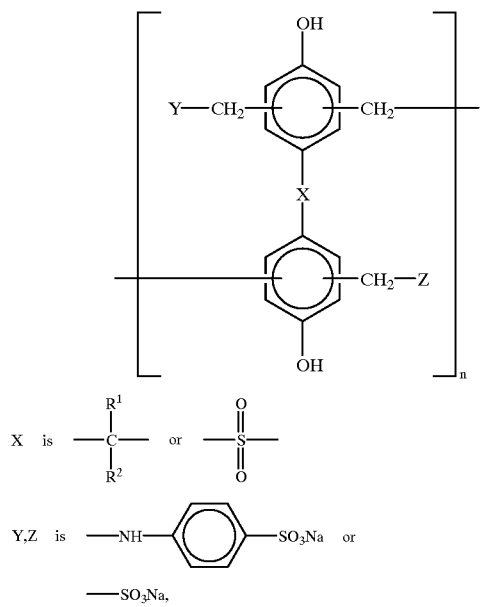

n is an integer ranging from 7 to 40, and $R^1$ and $R^2$ are hydrogen or lower alkyl groups and may be the same or different.

3. The electrocoagulation printing ink according to claim 2, wherein n is an integer ranging from 15–25.

4. Printed matter printed by said electrocoagulation printing ink according to claim 1.

5. An electrocoagulation printing method utilizing said electrocoagulation printing ink according to claim 1.

6. The electrocoagulation printing ink according to claim 1, wherein said bisphenol sulfonic acid polymer has a weight average molecular weight of 5000 to 30,000 and is in an amount range of about 0.05 to about 5% by weight, based on the total weight of said ink.

7. An electrocoagulation printing ink comprising an electrolytically coagulable polymer, a soluble electrolyte, a pigment, and a liquid medium, wherein the particle size of said pigment at 50% of the volume accumulation is 0.3 to 2 $\mu$m when dispersed in said ink, and wherein a ratio of particles with a particle size equal to or less than 0.2 $\mu$m is equal to or less than 25% by weight in the particle size distribution of said pigment.

8. The electrocoagulation printing ink according to claim 7, further comprising a dispersant in an amount of 0.02 to 0.6 g for 1 $cm^3$ of the pigment.

9. Printed matter printed by said electrocoagulation printing ink according to claim 7.

10. An electrocoagulation printing method utilizing said electrocoagulation printing ink according to claim 7.

11. The electrocoagulation printing ink according to any one of claims 1 or 7, wherein the acid valve volume of said electrolytically coagulable polymer is 30 to 200 mgKOH/g, the weight average molecular weight of said electrolytically coagulable polymer is about 10,000 to 1,000,000, the amount of said electrolytically coagulable polymer is about 4 to about 15% by weight based on the total weight of said ink, the amount of said soluble electrolyte is about 5 to about 10% by weight based on the total weight of said ink, the amount of said pigment is about 4 to about 20% by weight based on the total weight of said ink and the pH of said ink is about 3 to about 8.

12. The electrocoagulation printing ink according to any one of claims 1 or 7, further comprising a metal ion sequestering agent in an amount range of about 0.01 to about 0.3% by weight based on the total weight of said ink.

13. An electrocoagulation printing ink comprising, based on the total weight of said ink, of about 4 to about 15% by weight of an anionic acrylamide polymer, about 4 to about 20% by weight of a pigment, about 5 to about 10% by weight of an alkali metal halide, about 0.1 to about 5% by weight of a bisphenol sulfonic acid polymer and about 60 to about 80% by weight of water.

14. The electrocoagulation printing ink according to claim 13, further comprising about 0.01 to about 0.3% by weight of a polyaminocarboxylic acid or salt thereof and about 0.01 to about 2%b by weight of a biocidal agent.

* * * * *